United States Patent
Hayashi

(10) Patent No.: US 6,906,830 B1
(45) Date of Patent: Jun. 14, 2005

(54) COMPACT IMAGE SCANNER CAPABLE OF READING BOTH A LIGHT-REFLECTING ARTICLE AND A LIGHT-TRANSMITTING ARTICLE

(75) Inventor: Hisao Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/492,521

(22) Filed: Jan. 27, 2000

(30) Foreign Application Priority Data

Jan. 25, 1999 (JP) .......................................... 11-015169

(51) Int. Cl.⁷ ................................................. H04N 1/04
(52) U.S. Cl. ........................ 358/474; 358/498; 358/488; 358/506; 358/509; 358/475; 358/487; 358/496
(58) Field of Search ................................. 358/474, 498, 358/497, 496, 488, 506, 509, 475, 487

(56) References Cited

U.S. PATENT DOCUMENTS

| | | | | |
|---|---|---|---|---|
| 4,763,159 A | * | 8/1988 | Temple ........................... 355/3 |
| 4,879,604 A | * | 11/1989 | Koshiyouji ................. 358/474 |
| 4,989,099 A | * | 1/1991 | Koshiyouji et al. ......... 388/474 |
| 5,013,916 A | * | 5/1991 | Umemoto et al. .......... 250/327 |
| 5,214,520 A | * | 5/1993 | Miyazawa ................... 358/461 |
| 5,289,000 A | * | 2/1994 | Toyofuku ................... 250/234 |
| 5,422,208 A | * | 6/1995 | Koima et al. ................. 430/19 |
| 5,677,777 A | * | 10/1997 | Tsai ............................ 358/475 |
| 5,926,560 A | * | 7/1999 | Ichinose et al. ............ 382/162 |
| 5,946,427 A | * | 8/1999 | Kanemitsu ................... 382/312 |
| 6,233,065 B1 | * | 5/2001 | Lee ............................. 358/475 |
| 6,252,684 B1 | * | 6/2001 | Lin ............................. 358/498 |
| 6,259,113 B1 | * | 7/2001 | Funabashi ................... 250/588 |
| 6,323,933 B1 | * | 11/2001 | Anzai .......................... 355/23 |
| 6,335,982 B1 | * | 1/2002 | Arai ........................... 382/149 |
| 6,341,835 B1 | * | 1/2002 | Ogawa ........................ 347/16 |

* cited by examiner

*Primary Examiner*—Kimberly Williams
*Assistant Examiner*—Negussie Worku
(74) *Attorney, Agent, or Firm*—McGinn & Gibb, PLLC

(57) ABSTRACT

The image scanner 101 comprises a manuscript conveying unit 102 having conveying rolls 115, 116 for conveying a manuscript 111 and a first light source 114, and a manuscript reading unit 103 mounted on the manuscript conveying unit 102. The manuscript reading unit 103 detects movement of the manuscript 111 in the sub-scanning direction 118 by a rotation detecting roll 122 driven by the conveying roll 115. When the manuscript 111 is a reflection-type one, only a second light source 124 is switched ON to read the manuscript 111. When the manuscript 111 is a transmission-type one, only the first light source 114 is switched ON to read the manuscript 111. The image scanner 101 does not have a fixed platen. One-dimensional CCD 131 is fixed. The image scanner 101 can therefore be small in size.

19 Claims, 8 Drawing Sheets

COMPACT IMAGE SCANNER CAPABLE OF READING BOTH A LIGHT-REFLECTING ARTICLE AND A LIGHT-TRANSMITTING ARTICLE

BACKGROUND OF THE INVENTION

This invention relates to an image scanner, particularly to an image scanner for use in reading an image of a sheet-like medium, such as a manuscript and a film.

It is a recent trend that a personal computer of high performance can be provided at a low cost. This trend makes image information processing be very popular and increases chance to deal with various image information for everyone. Under the circumstances, it is frequent that various informations including a manuscript are inputted into such a personal computer. With such a change of the circumstances, information are converted into electronic information to construct a filing system consisting of integrated information, even if the information were recorded in a paper, a photo film, or OHP (Over Head Projector) paper that has been conventionally used as a recording medium of information. Further, an Internet comes to be in common use with developments of computers or communication technology. As a result, image information has been used considerably even in a field of home page or electronic mail.

As a way of inputting such various image informations, an image scanner is used to read the image. Conventionally, image scanners are mainly classified into either reflection type image scanners or transmission type image scanners. The reflection type image scanners, which are represented by a frat bed scanner and a sheet feed scanner, read, for example, a photo printed in , a magazine, a newspaper, a printed article printed and outputted by a printer, a hand-written manuscript, and the like by a reflection light. On the other hand, the transmission type image scanners, which are represented by a film scanner to read a film such as 35 mm film, and the like, read an image recorded in a transmission manuscript such as a positive film, a negative film, and the like.

The reflection type image scanners read a manuscript by the use of a light reflected by the manuscript while the transmission type image scanners read a manuscript by the use of a light transmitted through the manuscript. In the former, namely the reflection type image scanners, the light reflected by the manuscript is to be incident into an image sensor. It is therefore necessary that both the image sensor and a light source should be positioned at one side of the manuscript commonly to each other. On the other hand, in the latter, namely the transmission type image scanners, the light transmitted through the manuscript is to be incident into an image sensor. It is therefore necessary that the manuscript should be located between a light source and the image sensor. By difference of structure thus mentioned, conventionally, these two types of image scanners are sold and used as articles different from each other, In the interim, as described above, chance of inputting an image by an image scanner is increased. Further, it comes to be popularized that reading of image by using image scanners are carried out even in a comparatively small office and a family. However, from the viewpoints of a space for locating the image scanner and the purchase price, it is still difficult for users to acquire both the reflection type and the transmission type image scanners separately. Consequently, it is strongly desired that an image scanner having functions of both the reflection type and the transmission type image scanners is provided to users. Some proposals are made to provide such an image scanner having functions of both the reflection type and the transmission type image scanners. For example, image scanners having the both functions thereof are exemplified in unexamined Japanese Patent Publications, Hei8-88736, namely 88736/1996, and Hei4-167964, namely 157964/1992, respectively. Further, an image scanner similarly having the both functions thereof is exemplified in examined Japanese Patent Publication, Hei5-76222, namely 76222/1993. However, the image scanners disclosed in these examples have, to be sure, functions of both the reflection type and the transmission type image scanners. It is inevitably caused to occur that the image scanners become large in size.

SUMMARY OF THE INVENTION

It is therefore an object of the present invention to provide an image scanner which is capable of reading both a light-reflecting manuscript and a light-transmitting manuscript and which can be compact in size.

Other objects of this invention will become clear as the description proceeds.

According to an aspect of this invention, there is provided an image scanner for use in reading image information, comprising;

conveying means for conveying a manuscript including said image information to be read on a predetermined reading position of a conveying route;

a first light source which is located at one side of said conveying route and which emits light onto said predetermined reading position from said one side;

a second light source which is located at another side of said conveying route with being opposite to said first light in source and which emits light onto said predetermined reading position from said another side opposite to said one side;

image information reading means for reading said image information included in said manuscript at said predetermined reading position on said conveying route by light-electricity conversion; and light source switching control means for controlling light source switching between said first and said second light sources to read said image information included in said manuscript, said light source switching control means rendering only said first light source ON when said image information is defined by a transmitting light transmitting through said manuscript, said light source switching control means rendering only said second light source ON when said image information is defined by a reflected light reflected by said manuscript.

According to another aspect of this invention, there is provided an image scanner for use in reading image information, comprising:

a driving side conveying roll for conveying a manuscript including said image information to be read;

a driven side conveying roll which is located above said driving side conveying roll and which rotates by rolling-contact with said driving side conveying roll;

a manuscript sensor for detecting said manuscript when a head of said manuscript arrives at a position near the rolling-contact position between said driving side conveying roll and said driven side conveying roll;

conveying roll driving means for starting a rotation of said driving side conveying roll when said manuscript sensor has detected an arrival of said head of said manuscript;

light-electricity conversion means for carrying out light-electricity conversion of said image information per one line in a main-scanning direction of said manuscript from a side of one surface of said manuscript at a reading position on a conveying route when said driving side conveying roll is started to rotate by said conveying roll driving means and said manuscript is thereby started to move toward the sub-scanning direction between said driving side and said driven side conveying rolls, said reading position existing downstream of said conveying route from the rolling-contact position by a predetermined distance;

a first light source for emitting light onto said reading position from a side of another surface of said manuscript opposite to said one surface thereof;

a second light source for emitting light onto said reading position from a side of the same surface of said manuscript as said one surface thereof; and light source switching control means for selectively rendering either said first light source or said second light source ON to read said image information included in said manuscript, dependent on whether said image information is defined by a reflected light reflected by said manuscript or by a transmitting light transmitting through said manuscript.

According to yet another aspect of this invention, there is provided an image scanner for use in reading image information, comprising:

a driving side conveying roll for conveying a manuscript including said image information to be read;

a driven side conveying roll which is located above said driving side conveying roll and which rotates by rolling-contact with said driving side conveying roll;

a manuscript sensor for detecting said manuscript when a head of said manuscript arrives at a position near the rolling-contact position between said driving side conveying roll and said driven side conveying roll;

conveying roll driving means for starting a rotation of said driving side conveying roll when said manuscript sensor has detected an arrival of said head of said manuscript;

light-electricity conversion means for carrying out light-electricity conversion of said image information per one line in a main-scanning direction of said manuscript from a side of one surface of said manuscript at a reading position on a conveying route when said driving side conveying roll is started to rotate by said conveying roll driving means and said manuscript is thereby started to move toward the sub-scanning direction between said driving side and said driven side conveying rolls, said reading position existing downstream of said conveying route from the rolling-contact position by a predetermined distance;

a first light source for emitting light onto said reading position from a side of another surface of said manuscript opposite to said one surface thereof;

a second light source for emitting light onto said reading position from a side of the same surface of said manuscript as said one surface thereof; and light source selection input means for inputting whether either said first light source or said second light source should be selected, dependent on whether said image information is defined by a reflected light reflected by said manuscript or by a transmitting light transmitting through said manuscript, and light source switching control means for selectively rendering either said first light source or said second light source ON to read said image information included in said manuscript, responsive to a result of selection by said light source selection input means.

According to still another aspect of this invention, there is provided an image scanner for use in reading image information, comprising:

a driving side conveying roll for conveying a manuscript including said image information to be read;

a driven side conveying roll which is located above said driving side conveying roll and which rotates by rolling-contact with said driving side conveying roll;

a manuscript sensor for detecting said manuscript when a head of said manuscript arrives at a position near the rolling-contact position between said driving side conveying roll and said driven side conveying roll;

conveying roll driving means for starting a rotation of said driving side conveying roll when said manuscript sensor has detected an arrival of said head of said manuscript;

light-electricity conversion means for carrying out light-electricity conversion of said image information per one line in a main-scanning direction of said manuscript from a side of one surface of said manuscript at a reading position on a conveying route when said driving side conveying roll is started to rotate by said conveying roll driving means and said manuscript is thereby started to move toward the sub-scanning direction between said driving side and said driven side conveying rolls, said reading position existing downstream of said conveying route from the rolling-contact position by a predetermined distance;

a first light source for emitting light onto said reading position from a side of another surface of said manuscript opposite to said one surface thereof;

a second light source for emitting light onto said reading position from a side of the same surface of said manuscript as said one surface thereof; and manuscript type judging means which respectively renders said first and said second light sources exclusively ON on a condition that said manuscript is existing at said reading position to compare respective signal levels after conversion by said light-electricity conversion means, and which thereby judge whether said manuscript is such a type of manuscript as read by a transmitting light transmitting through said manuscript or such an another type of manuscript as read by a reflected light reflected by said manuscript; and light source switching control means for selectively rendering either said first light source or said second wit source ON to read said image information included in said manuscript, responsive to a result of judgement by said manuscript type judging means.

DETAILED DESCRIPTION OF THE PREFERRED EMBODIMENTS

Figure 1:
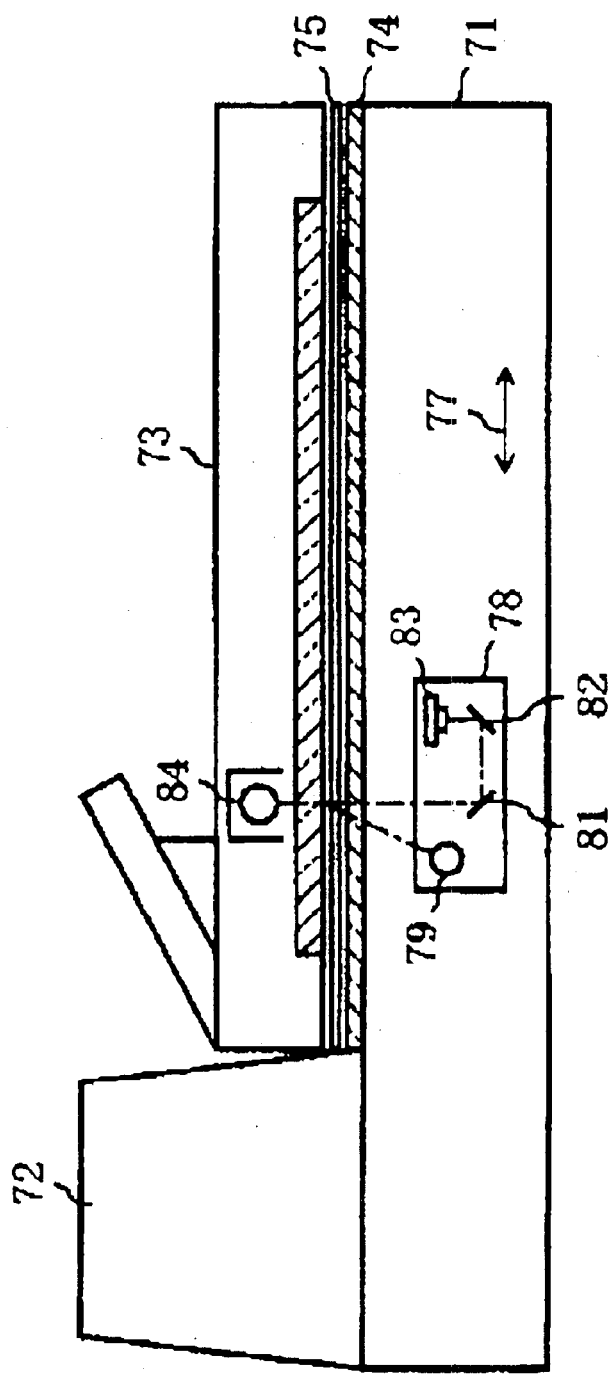
FIG. 1 is a schematic view for showing a structure of a conventional image scanner of the third example that is capable of reading both a reflection type manuscript and a transmission type manuscript.

Referring to FIG. 1, description is, at first made about a conventional image scanner in order to facilitate an understanding of the present invention. FIG. 1 is a schematic view for showing a structure of the conventional image scanner of the third example exemplified in the examined Japanese Patent Publication Hei5-76222, namely 76222/1993 which is mentioned in the preamble of the instant specification and which is capable of reading both a reflection type manuscript and a transmission type manuscript.

As illustrated in FIG. 1, the image scanner comprises a base unit 71, an automatic paper feeding unit 72 located on the base unit 71 at the left-hand side of FIG. 1. At the right-hand side of FIG. 1, a transmission unit 73 serving also as a manuscript cover is located on the base unit 71 through a platen glass 74. In the example being illustrated, a manuscript 75, which is either reflection type or transmission type, is set on to be sandwiched between the platen glass 74 and the transmission unit 73.

Inside of the base unit 71 of this image scanner, a sensor unit 78 is located to freely move back and forth in the sub-scanning direction 77. A first lamp 79 for reading image information by the use of a reflected light of the manuscript 75, first and second mirrors 81, 82 for one by one reflecting a light beam progressed in the perpendicular direction from the platen glass 74, and a line sensor 83 for reading image information by receiving light beam reflected by the second mirror 82 are located in the sensor unit 78. On the other hand, inside of the transmission unit 73, a second lamp 84 is located to be movable in the sub-scanning direction 77.

With the structure, the conventional image scanner puts the first lamp 79 off and the second lamp 84 on, when the manuscript 75 is a transmission type one. With this condition being kept, the manuscript 75 is subjected to sub-scanning by moving the sensor unit 78 in the right-hand direction of FIG. 1 at a uniform speed. In addition, a light beam emitted from the second lamp 84 are received by the first mirror 81 through the manuscript 75 by moving the second lamp 84 similarly in the sub-scanning direction 77. Since the line sensor 83 is incorporated in the sensor unit 78, reading of image information is achieved only by moving such two components simply in the sub-scanning direction 77.

On the other hand, the conventional image scanner puts the first lamp 79 on and the second lamp 84 off, when the manuscript 76 is a reflection type one. With this condition being kept, the sensor unit 78 is moved in the sub-scanning direction 77 at a uniform speed. In this case, it is not necessary to move the second lamp 84.

In the conventional image scanner illustrated in FIG. 1, since the line sensor 83 is located in the sensor unit 78, a length of light path is constant in the unit. However, the sensor unit 78 inevitably becomes large in size to acquire the length of light path. As a result, a driving system for driving such a large sensor unit 78 is required to be strong or large. Furthermore, also the image scanner itself inevitably becomes large in size, when the sensor unit 78 has such a large size.

Figure 2:
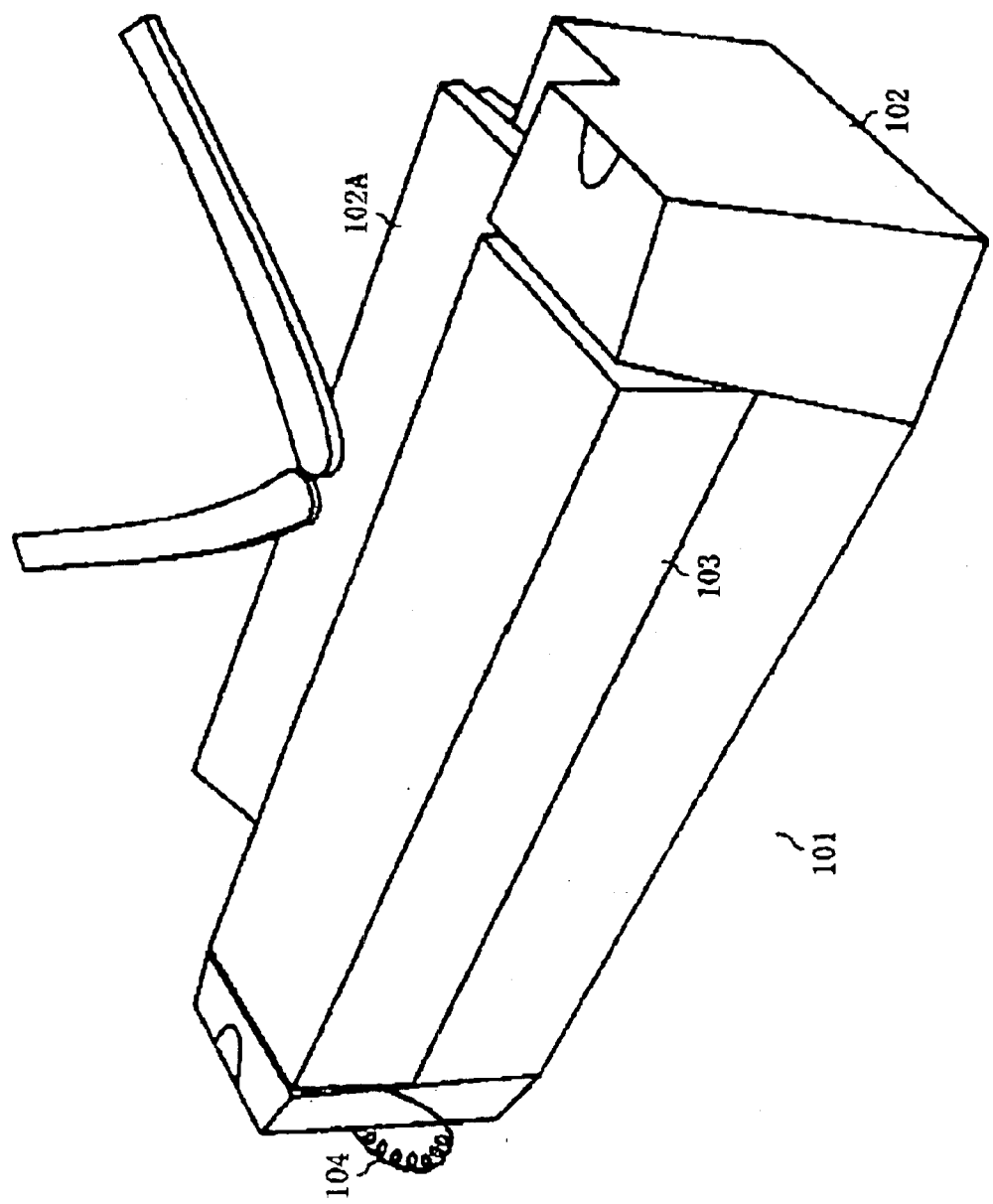
FIG. 2 is a schematic perspective view for showing outviews of an image scanner according to a first embodiment of the present invention.

Referring now to FIGS. 2 through 8, description will proceed to an image scanner according to a first embodiment of the present invention. FIG. 2 is a schematic perspective view for showing outviews of the image scanner according to the first embodiment of the present invention.

As illustrated in FIG. 2, the image scanner 101 comprises a manuscript conveying unit 102 having a paper feeding tray 102A for conveying manuscripts one by one, and a manuscript reading unit 108 mounted on an upper portion of recessed portion positioned in central portion of the manuscript conveying unit 102. A connecting cable 104 is drawn from the manuscript reading unit 103. A connector (not shown) is attached to a head of the connecting cable 104. The connector (not shown) is coupled to another connector (not shown) of the manuscript conveying unit 102. The manuscript reading unit 103 can read both a reflection type manuscript and a transmission type manuscript on a condition that the manuscript reading unit 103 is mounted on the manuscript conveying unit 102. The manuscript reading unit 103 can be removed from the manuscript conveying unit 102 with keeping the connecting cable 104 coupled to the another connector (not shown) of the manuscript conveying unit 102. When removed from the manuscript conveying unit 102, the manuscript reading unit 103 can read a predetermined type of manuscripts, such as a book-like one manually. Alternatively, a power supply and an image data storing unit are provided in the manuscript reading unit 103 itself, so that the manuscript reading unit 103 can read image information without coupling the connecting cable 104 to the another connector (not shown) of the manuscript conveying unit 102.

Figure 3:
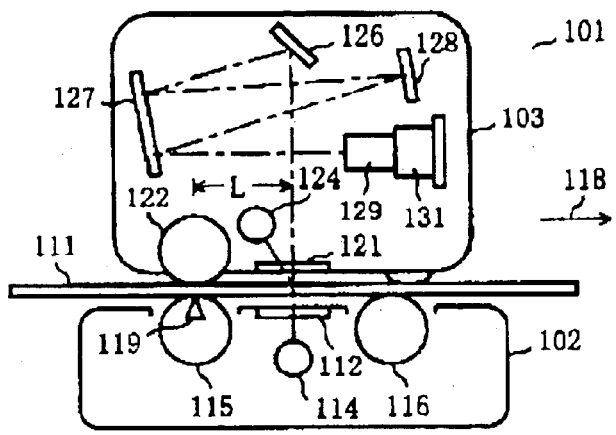
FIG. 3 is a schematic view for showing a structure of the image scanner when a sheet-like manuscript is automatically read by the image scanner according to the first embodiment of the present invention.

FIG. 3 is a schematic view for showing a structure of the image scanner illustrated in FIG. 2, when a sheet-like manuscript is automatically read by the image scanner. The manuscript conveying unit 102 is located in lower a half portion of the image scanner with respect to a boundary of a sheet-like manuscript 111. In the central upper portion within the manuscript conveying unit 102, a first glass plate 112 of a slender shape is located perpendicular to the sheet of FIG. 3. A first light source 114 is located directly under the first glass plate 112. This first light source 114 is such a light source having a cylindrical shape like a fluorescent lamp that is located perpendicular to the sheet of FIG. 3. The first light source 114 is used when the sheet-like manuscript 111 is read by transmitting light through the manuscript 111.

A couple of conveying rolls 115, 116 are located on both sides of the first glass plate 112 and the first light source 114 with the first glass plate 112 and the first light source 114 sandwiched between the conveying rolls 116 and 116. A surface of a roll of each conveying roll 115, 116 is, respectively, projecting upward a little from two opening portions formed on an upper surface of the manuscript conveying unit 102. The surface of a roll of each conveying roll 115, 116 is, respectively, rolling-contact with a lower surface of the sheet-like manuscript 111. The conveying rolls 115 and 116 are driven by a motor (not shown) within the manuscript conveying unit 102, respectively. The conveying rolls 115 and 116 are thereby rotated clockwise, respectively, to force the manuscript 111 to be conveyed in the sub-scanning direction 118 at a uniform speed. At the substantially same position where the conveying roll 115 is kept in contact with the manuscript 111, a manuscript sensor 119 is located to detect a head of the manuscript 111. The manuscript sensor 119 can be constructed from a microswitch. Alternatively, the manuscript sensor 119 can be such a sensor as optically detecting the manuscript 111 by coupling a light-emitting element and a light-receiving element. The manuscript sensor 119 is used to detect the manuscript 111 to start reading of image information, when the manuscript 111 is inserted into a position just above the conveying roll 115 by a user (an operator) of the image scanner, or the manuscript 111 is sent from a paper feeding tray of the image scanner to the position. The manuscript reading unit 103 is located in upper a half portion of the image scanner with respect to a boundary of a sheet-like manuscript 111. The manuscript reading unit 103 is adjusted to be fixed to a predetermined position on the manuscript conveying unit 102 on a condition in that the manuscript reading unit 103 is positioned in the predetermined position by a positioning mechanism (not shown). With this fixed condition, a second glass plate 121 of a slender shape located on a central of the bottom of the manuscript reading unit 103 is adjusted to be opposite to the first glass plate 112. The first glass plate 112 is constructed from a semi-transparent glass plate, such as frosted glass that causes diffused reflection of a light beam. On the other hand, the second glass plate 121 is constructed from a transparent glass plate. The second glass plate 121 has also a slender shape and is located perpendicular to the sheet of FIG. 3. Besides, the first and the second glass plate 112, 121 are sliding-contact with the manuscript 111 from both sides thereof, respectively. A surface of the manuscript 111 to be read is thereby prevented from floating up or waving, so that reading of image information with high precision is achieved. Further, also dust is thereby prevented from invading into the manuscript conveying unit 102 and the manuscript reading unit 103.

A rotation detecting roll 122, which is driven by the conveying roll 115, is located just adjacent and in parallel to the second glass plate 121 in the manuscript reading unit 103. The rotation detecting roll 122 is a roll for detecting movement of the manuscript 111 in the sub-scanning direction 118 by rotating relatively to the manuscript 111. The rotation detecting roll 122 transmits its rotation to a gear mechanism (not shown). The movement of the manuscript 111 is thereafter detected by an encoder which will be described later.

In this embodiment, the conveying roll 116 is provided in addition to the conveying roll 115, so that conveyance of the manuscript 111 may be carried out as smooth as possible, and so that an end of the manuscript 111 for which reading has been finished may be surely released from the manuscript reading unit 103. In a side of the manuscript reading unit 103, any pinch rolls are not provided opposite to the conveying roll 116. Of course, if such a pinch roll is located, the pinch roll is effective to stable conveyance of the manuscript 111. Therefore, this is not prohibited. A couple of rolls located opposite to each other conveys the manuscript 111 with having a comparatively wide nip region (a region where two rolls are rolling-contact with each other). This is effective to prevent the manuscript 111 from inclining.

Slightly above the second glass plate 121, a second light source 124 is located in parallel to the first light source 114.

The second light source 124 is such a light source that is used for reading the manuscript 111 by the use of a reflected light. The second light source 124 is located near the second glass plate 121 in order that loss of light may be minimized. Therefore, it is effective that a reflection mirror to restrict emitting direction of light beam is located around the circumference of the second light source 124, although the reflection mirror is not shown. The first light source 114 is similarly located near the first glass plate 112. This enables an efficient use of amount of light and makes the light source be small in size. It is also effective that such a reflection mirror is provided around the circumference of the first light source 114.

In one case, a light beam emitted from the second light source 124 and reflected by a read surface of the manuscript 111 is incident to the first mirror 126 located above the second glass plate 121. In another case, similarly, a light beam emitted from the first light source 114 and transmitting through the read surface of the manuscript 111 is incident to the first mirror 126 located above the second glass plate 121. In both cases, the light beam is then reflected by the second mirror 127 located above the rotation detecting roll 122. Thereafter, the light beam is incident to the third mirror 128 located opposite to the second mirror 127 to be reflected by the third mirror 128. The light beam reflected by the third mirror 128 is again reflected by the second mirror 127. The light beam again reflected by the second mirror 127 is incident to a lens 129 located just under the third mirror 128. Through the lens 129, the light beam incident to the lens 129 forms an image on one-dimensional CCD 131 located just adjacent to the lens 129.

As mentioned above, the first through the third mirrors 126 through 128 are provided in the manuscript reading unit 103. The light beam is reflected by these first through third mirrors 126 through 128 one by one to be incident to the lens 129. With the structure, an optical length from the read surface of the manuscript 111 to the lens 129 is adjusted to be larger, compared with another optical length from the lens 129 to the one-dimensional CCD 181. Consequently, a length of the main-scanning direction as a reading direction of the one-dimensional CCD 131 can be adjusted to be smaller, compared with that of the manuscript 111. Further, depth of photo object is reserved, so that, for example, an image in opened pages at both sides of a manuscript like a book is read well.

Figure 4:
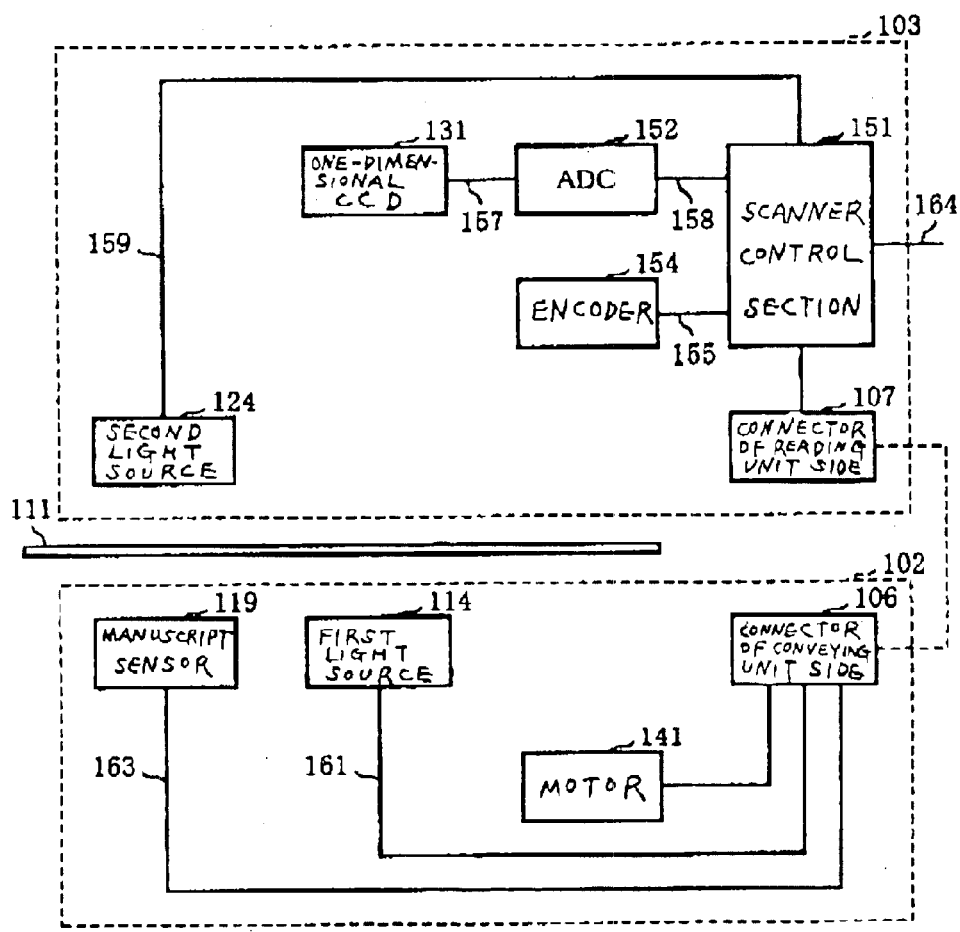
FIG. 4 is an explanation view for schematically explaining a constitution of a circuit of the image scanner according to the first embodiment of the present invention.

FIG. 4 is a schematic view for showing a constitution of a circuit of the image scanner according to the first embodiment. In FIG. 4, similarly to that in FIG. 3, a constitution of a circuit of the manuscript conveying unit 102 is shown in a lower half portion with respect to the manuscript 111 while a constitution of a circuit of the manuscript reading unit 103 is shown in an upper half portion with respect thereto.

In the manuscript conveying unit 102, as illustrated in FIG. 3, the first light source 114, the manuscript sensor 119, and a motor 141 for driving a couple of conveying rolls 115, 116 shown in FIG. 3 are located as electric components. These first light source 114, the manuscript sensor 119, and the motor 141 are connected to a connector 106 of a side of the conveying unit. The motor 141 drives a couple of the conveying rolls 115, 116 through a driving belt (not shown).

On the other hand, in the manuscript reading unit 103, a scanner controlling section 161 is located to control the manuscript conveying unit 102 as well as the manuscript reading unit 103. The scanner controlling section 151 is connected to the one-dimensional CCD 131 through an Analog to Digital Converter (ADC) 152. In addition, the scanner controlling section 151 is connected to the second light source 124, an encoder 154, and a connector 107 of a side of the reading unit. The encoder 154 is composed of a plurality stages of gears for enlarging a rotation angle of the rotation detecting roll 122 illustrated in FIG. 3, and a optical sensor for detecting On/Off by transmission of light between teeth of the final stage gear. A pulse signal 155 is adjusted to be outputted from the encoder 154 every time the rotation detecting roll 122 rotates a little.

The scanner controlling section 151 carries out processing in the sub-scanning direction 118 of the manuscript 111 based on the pulse signal 155. Namely, the one-dimensional CCD 131 scans the manuscript 111 in the main scanning direction perpendicular to the sub-scanning direction 118. Herein, a relative quantity of movement of the manuscript reading unit 103 against the manuscript III is judged based on the pulse signal 155 every time the relative quantity of movement in the sub-scanning direction 118 reaches intervals between one line and another one line. The Analog to Digital Converter (ADO) 152 converts a reading signal 157 of analog level into digital signal so as to output a reading signal 158. The reading signal 168 is captured by the scanner controlling section 151. A light switching signal 159 is supplied from the scanner controlling section 151 to the second light source 124.

Further, a light switching signal 161 is supplied from the connector 106 of a side of the conveying unit to the first light source 114. In addition, a result of detecting the manuscript 111 is supplied from the manuscript sensor 119 to the first light source 114 as a detection judging signal 163. Of course, if the manuscript sensor 119 is composed of a pair of light-emitting element and light-receiving element, a signal for supplying the light-emitting element with an electric power is supplied from the connector 106 of a side of the conveying unit to the manuscript sensor 119.

The connector 107 of a side of the reading unit electrically connected with the connector 106 of a side of the conveying unit is connected to the scanner controlling section 151 by a cable 162. Signal transmission between the manuscript conveying unit 102 and the scanner controlling section 151 is carried out through the connector 107 and the connector 106. The scanner controlling section 151 is driven by a power source (not shown). The scanner controlling section 151 is connected with an information processing device (not shown) such as a computer, or the like through a cable 164. Transmission and reception of various signals therebetween are carried out through the cable 164. The various signals are not only a reading signal outputted from the scanner controlling section 151 by reading the manuscript 111 but also the detection judging signal 163 obtained from the manuscript sensor 119, and light switching signals for controlling switching of the first and the second light sources 114 and 124, and like other signals.

Figure 5:
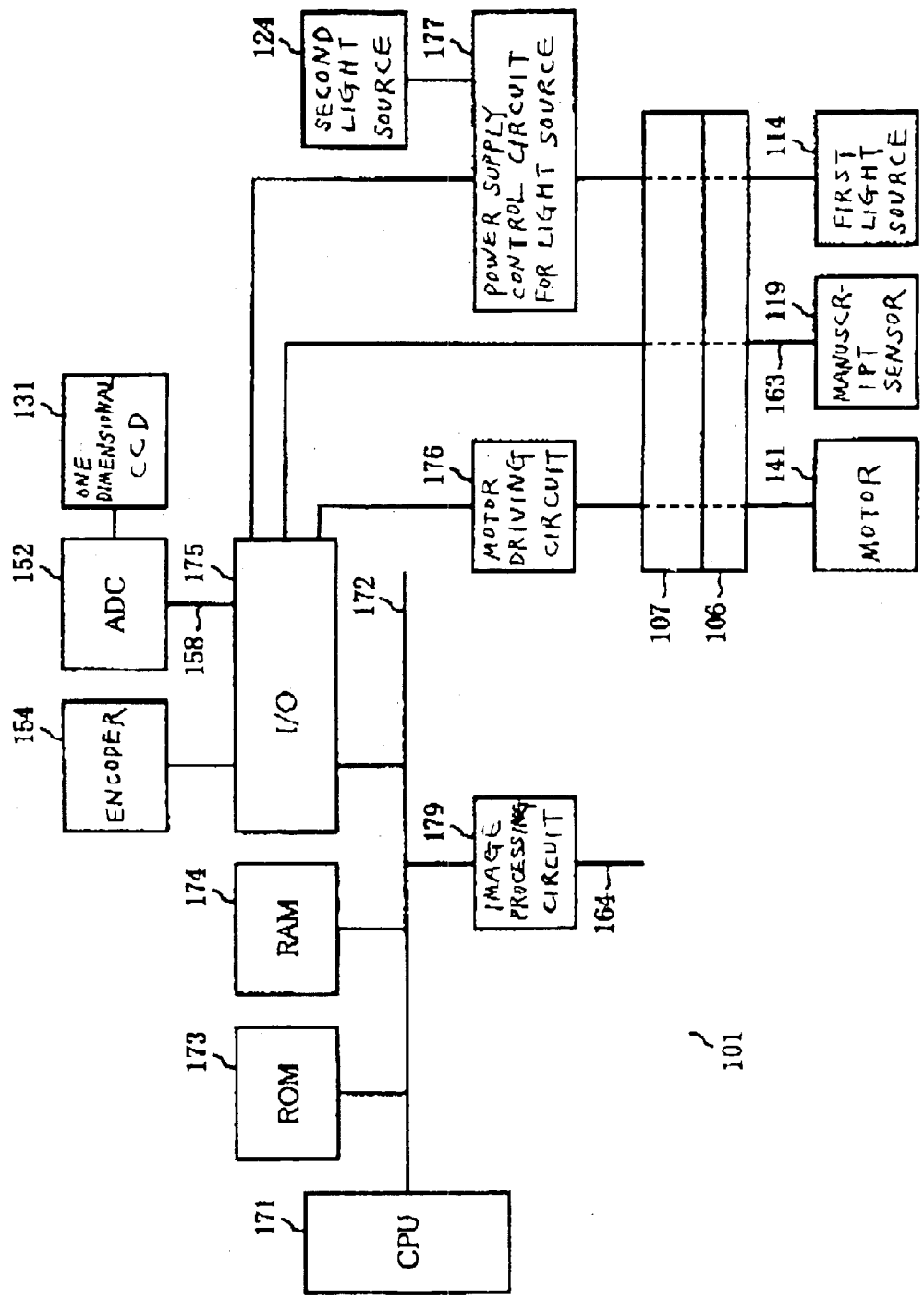
FIG. 5 is a schematic block diagram for showing a constitution of a scanner control section in an image scanner according to the first embodiment of the present invention.

FIG. 5 is a schematic view for showing a constitution of the scanner controlling section 151. The scanner controlling section 151 comprises a CPU (central processing unit) 171. The CPU 171 is connected to each section in the image scanner through the bus 172 such as data bus, and the like. Among the sections, a ROM 173 is a Read Only Memory storing a program for various controls of the image scanner while a RAM 174 is a Random Access Memory for con-temporarily storing various data used in the program controls of the image scanner. I/O (input and output) circuit 175 is a circuit for sending or receiving signals with various input and output circuits in the image scanner. In this embodiment, the Analog to Digital Converter (ADC) 152, the encoder 154, a motor driving circuit 176 and a power supply controlling circuit 177 for light sources are connected to the I/O (input and output) circuit 176.

Among them, the motor driving circuit 176 is connected to the motor 141 through the connector 107 of a side of the reading unit and the connector 106 of a side of the conveying unit. The motor driving circuit 176 is adjusted to supply the motor 141 with a driving power or a driving pulses for driving the motor 141. The power supply controlling circuit 177 for light sources is not only connected to the first light source 114 to control switching thereof through the connector 107 of a side of the reading unit and the connector 106 of a side of the conveying unit, but also directly connected to the second light source 124 to control switching thereof. The I/O circuit 175 is connected to the manuscript sensor 119 through the connector 107 of a side of the reading unit and the connector 106 of a side of the conveying unit and is adjusted to input the detection judging signal 163 obtained from the manuscript sensor 119.

In addition, an image processing circuit 179 is connected to the bus 172. The image processing circuit 179 is adjusted to output image data per each line, based on the reading signal 158 inputted to the I/O circuit 175 from the one-dimensional CCD 131 through the Analog to Digital Converter (ADC) 152. The outputted image data are sent to the information processing device (not shown) by the cable 164.

Figure 6:
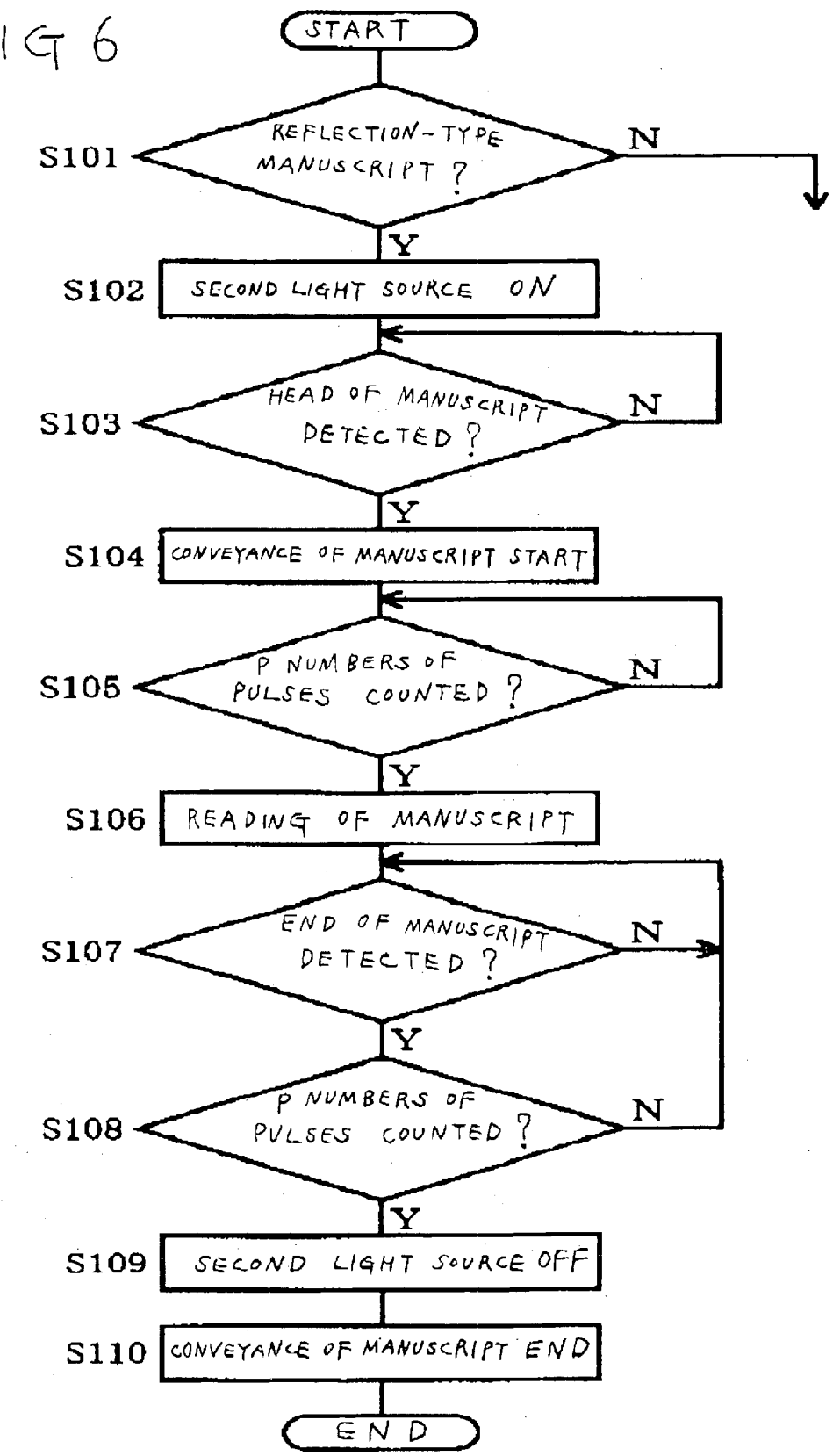
FIG. 6 is a flow chart for showing a control when a reflection type manuscript is read by an image scanner according to the first embodiment of the present invention.

FIG. 6 is a flow chart for showing a control operation in which the image scanner is connected to the computer (not shown) to carry out reading of image. In the following description, it is assumed that the manuscript reading unit 103 is set on the manuscript conveying unit 102.

CPU 171 monitors input by an operator in computer whether the manuscript to be read by this image scanner is a reflection-type one or a transmission-type one. This is because a software for driving the image scanner(scanner driver) is previously installed to the computer, and it is required by the scanner driver that an operator should input a type of manuscript to be read before starting the reading of image thereof.

When CPU 171 judges that the type of manuscript is a reflection-type one by the input of the operator (Yes in S101), the CPU 171 controls the power supply controlling circuit 177 for light sources to switch only the second light source 124 ON. On this condition, the CPU 171 monitors a timing when the manuscript sensor 119 detects a head of the manuscript 111 through the I/O circuit 175 (S103). This is because the image scanner starts conveyance of the manuscript 111 to read the manuscript 111 at the time when the manuscript 111 is inserted between the conveying roll 115 and the rotation detecting roll 122.

When the head of the manuscript 111 is detected, the CPU 171 controls the motor driving circuit 176 to start a rotation of the motor 141. The motor 141 then drives the couple of conveying roll 115, 116 to rotate (S104). As a result, the manuscript 111 inserted between the conveying roll 115 and the rotation detecting roll 122 is conveyed in the sub-scanning direction 118 at a uniform speed. Pulse signals 155 are counted up to the numbers of pulses P corresponding to the time from the time when the conveyance is started until the manuscript 111 is conveyed by a distance L from the nip position illustrated in FIG. 3 in which the conveying roll 115 and the rotation detecting roll 122 is rolling-contact with each other to the reading position for reading a manuscript in the substantially central portion of the second glass plate 121 (Yes in S105), and the reading of the manuscript 111 by the reflection light is started at the time of the count up (S106).

The reading of the manuscript 111 is continued from the time when a backward end of the manuscript 111 is detected similarly by the manuscript sensor 119 (Yes in S107) until the time when pulse signals 155 are counted up to the numbers of pulses P (Yes in S108). The second light source 124 is switched OFF (S109) and conveyance of the manuscript 111 is finished (S110) at the time when pulse signals 155 are counted up to the numbers of pulses P. In a case that an image scanner has such a structure as having also a pinch roll above the conveying roll 116, the manuscript 111 is yet sandwiched between the conveying roll 116 and the pinch roll, even at the time. Accordingly, in that case, pulse signals 165 are counted so that the motor 141 may be stopped to be driven after a predetermined time has passed from the time.

Figure 7:
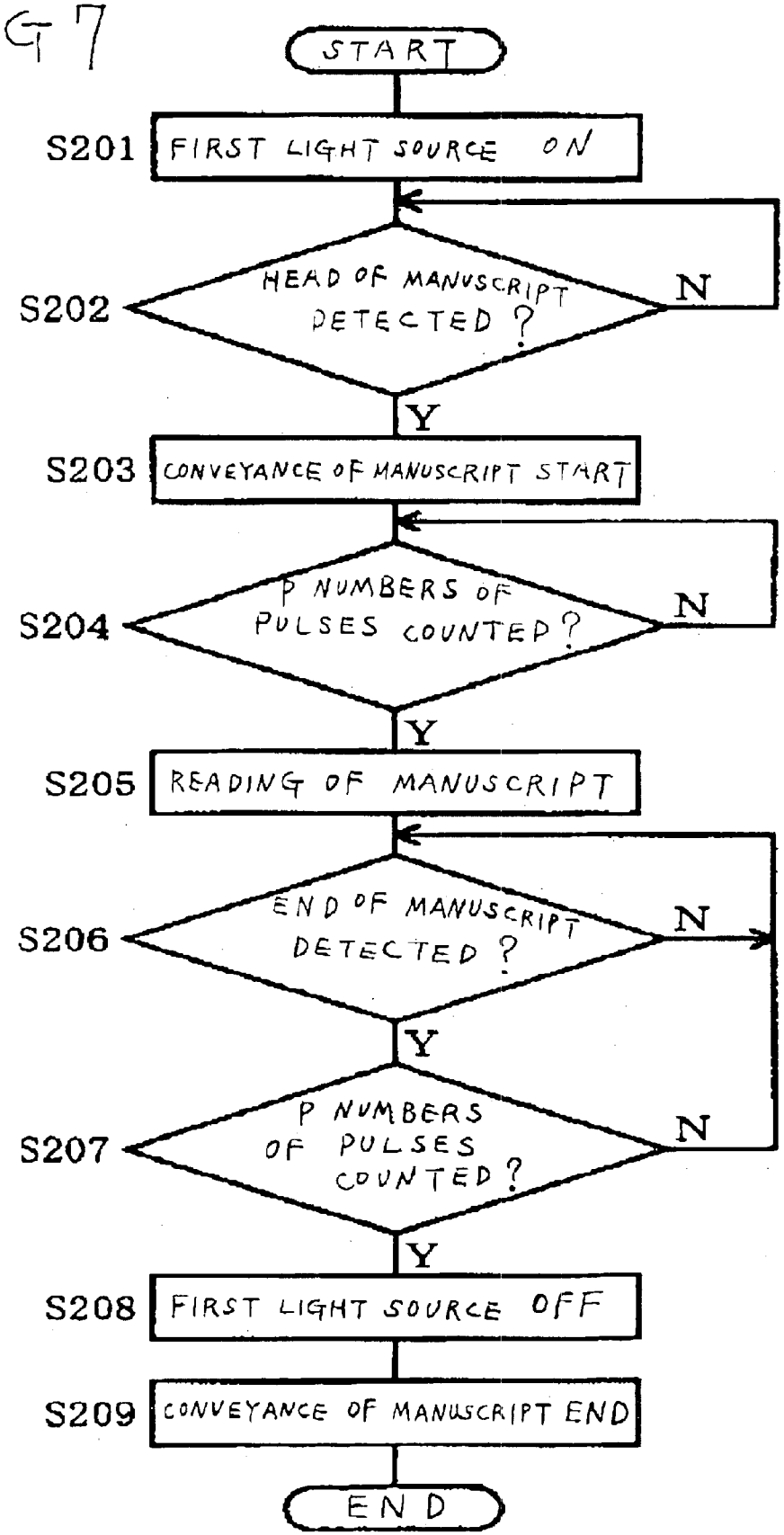
FIG. 7 is a flow chart for showing a control when a transmission type manuscript is read by an image scanner according to the first embodiment of the present invention.

FIG. 7 is a flow chart for showing a control operation in a case that the operator indicates reading of the transmission-type manuscript in step S101 of FIG. 6. In this case, the CPU 171 orders the power supply controlling circuit 177 for light sources to switch only the first light source 114 ON (S201). On this condition, the CPU 171 then monitors the timing when the manuscript sensor 119 detects a head of the manuscript 111 through the I/O circuit 176 (S202).

When the head of the manuscript 111 is detected, the CPU 171 controls the motor driving circuit 176 to start rotation of the motor 141. A couple of the conveying rolls 115, 116 are thereby driven to be rotated (S203). As a result, the manuscript 111 inserted between the conveying roll 115 and the rotation detecting roll 122 is conveyed in the sub-scanning direction 118 at a uniform speed. Pulse signals 155 are counted up to the numbers of pulses P corresponding to the time from the time when the conveyance is started until the manuscript 111 is conveyed by a distance L from the nip position illustrated in FIG. 3 in which the conveying roll 115 and the rotation detecting roll 122 is rolling-contact with each other to the reading position for reading a manuscript in the substantially central portion of the second glass plate 121 (Yes in S204), and the reading of the manuscript 111 by the transmission light is started at the time of the count up (S205).

The reading of the manuscript 111 is continued from the time when a backward end of the manuscript 111 is detected similarly by the manuscript sensor 119 (Yes in S206) until the time when pulse signals 155 are counted up to the numbers of pulses P (Yes in S207). At that time, the first light source 114 is switched OFF (S208) and conveyance of the manuscript 111 is finished (S209) at the time when pulse signals 155 are counted up to the numbers of pulses P. In a case that an image scanner has such a structure as having also a pinch roll above the conveying roll 116, the manuscript 111 is yet sandwiched between the conveying roll 116 and the pinch roll, even at the time. Accordingly, in that case, pulse signals 155 are counted so that the motor 141 may be stopped to be driven after a predetermined time has passed from the time.

Figure 8:
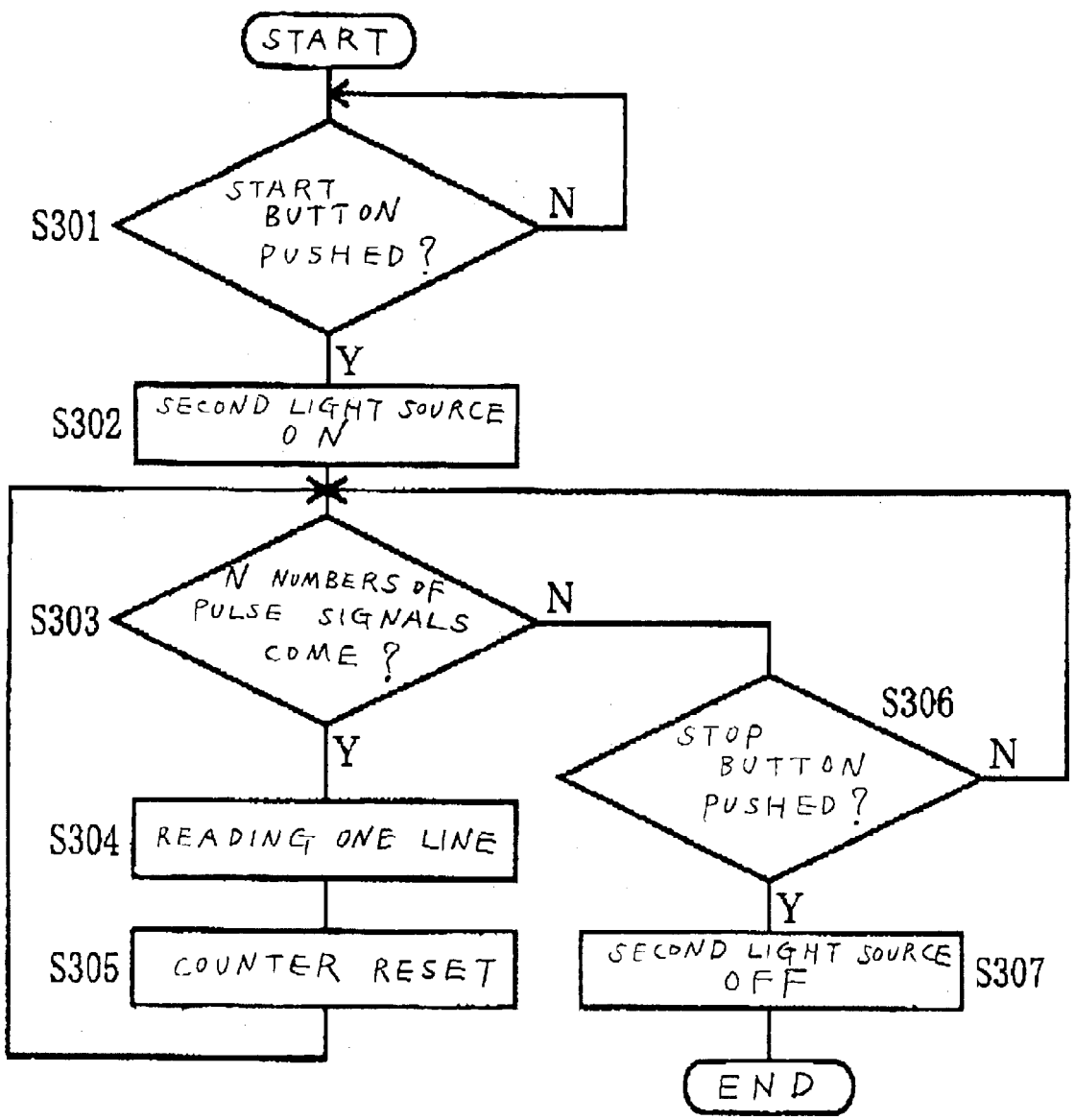
FIG. 8 is a flow chart for showing a control when only a manuscript-reading section is used to read a manuscript in an image scanner according to the first embodiment of the present invention.

FIG. 8 is a flow chart for showing a control operation in a case that only the manuscript reading unit 103 is singly used to read the manuscript 111. In this case, the manuscript 111 to be read is a reflection-type one except for specific cases. One of the specific cases is, for example, a manual scan is carried out to read an image on the manuscript 111 which is irradiated with backlight by the use of a certain device. When the operator carries out reading of the manuscript 111 using only the manuscript reading unit 103, he is required to indicate so in the above-mentioned computer. Namely, after a manuscript reading position of the manuscript reading unit 103 is adjusted to the end of the manuscript 111, the operator clicks a start button in a display of the computer (not shown) by a mouse, or pushes an enter key on a keyboard (not shown). Alternatively, a button for starting the reading of image may be provided on the manuscript reading unit 103 itself, and the operator may push the button when preparation therefor is finished.

When the start button (enter key) is pushed (Yes in S301), the CPU 171 renders the second light source 124 ON (S302). Thereafter, it is counted by a counter consisting of a software whether or not numbers of pulse signals 155 outputted from the encoder 154 illustrated in FIG. 4 become equal to a predetermined numbers N (S303). The predetermined numbers (counted value) N is determined to be numbers of the pulse signals 155 outputted from the encoder 154 during movement of the image scanner per one line in the sub-scanning direction 118. As a result, when a resolution in the sub-scanning direction 118 is determined to be high by the operator, the counted value N becomes smaller in response thereto.

When the counted value N is counted by the counter consisting of a software (Yes in S303), the CPU 171 captures a reading signal 157 that has already been read by the one-dimensional CCD 181 or another reading signal 158 that has been digitized outputted from Analog to Digital converter 152 at that time to produce a reading signal of one line. The reading signal of one line is then sent to the information processing device of the following stage (a computer in this embodiment) by the cable 164. Accordingly, image information of one line has been read. Thereafter, the counter consisting of software is reset (S305). The CPU 171 waits for input of a result of reading of next line.

Besides, if the operator pushes the stop button of the computer before N numbers of the pulse signals 155 are outputted from the encoder 154 (S306), the second light source 124 is switched OFF at that time (S807). Accordingly, reading of the manuscript 111 will be finished at the time (END).

In the control illustrated in FIG. 8, start and end of reading of the manuscript is controlled by operating the start button (enter key) or the stop button of the computer. Start and end of reading of the image data may be controlled by monitoring the pulse signals 155 outputted from the encoder 154 illustrated in FIG. 4. Namely, when the operator touches the manuscript reading unit 103 to the manuscript or a place having an image to be read and starts the movement thereof, the pulse signal 155 is started to be outputted. Therefore, capturing of image is started from that time. The capturing of image may be stopped when the movement of the manuscript reading unit 103 is stopped. Similarly, when the manuscript reading unit 103 is lifted up and so a predetermined time has his passed after the pulse signal 155 is stopped, the capturing of image may be stopped. A region of image obtained as the result of that often becomes larger than a region to be read actually. However, it is readily possible for the operator to make the captured image be displayed in the computer to cut out the required region. Further, a scope of image to be read is determined, dependent on operating condition of the manuscript reading unit 103, thus mentioned. Accordingly, an input operation of image can be simplified.

Besides, as regards the reading operation of the manuscript 111 in step S106 of FIG. 6 and step S206 of FIG. 7, reading signals can be made by the use of the result of reading by the one-dimensional CCD 131 at constant time intervals, provided that a precision of conveyance of the manuscript 111 is sufficiently high in the sub-scanning direction by a couple of conveying rolls 115, 116. However, since the image scanner according to this embodiment has the encoder 154, it is enough to count numbers of the pulse signals 155 similarly to the description with reference to FIG. 8 and output image information per one line every time the numbers of the pulse signals 155 become a predetermined numbers. As a result, a precise reading of image is always achieved.

Figure 9:
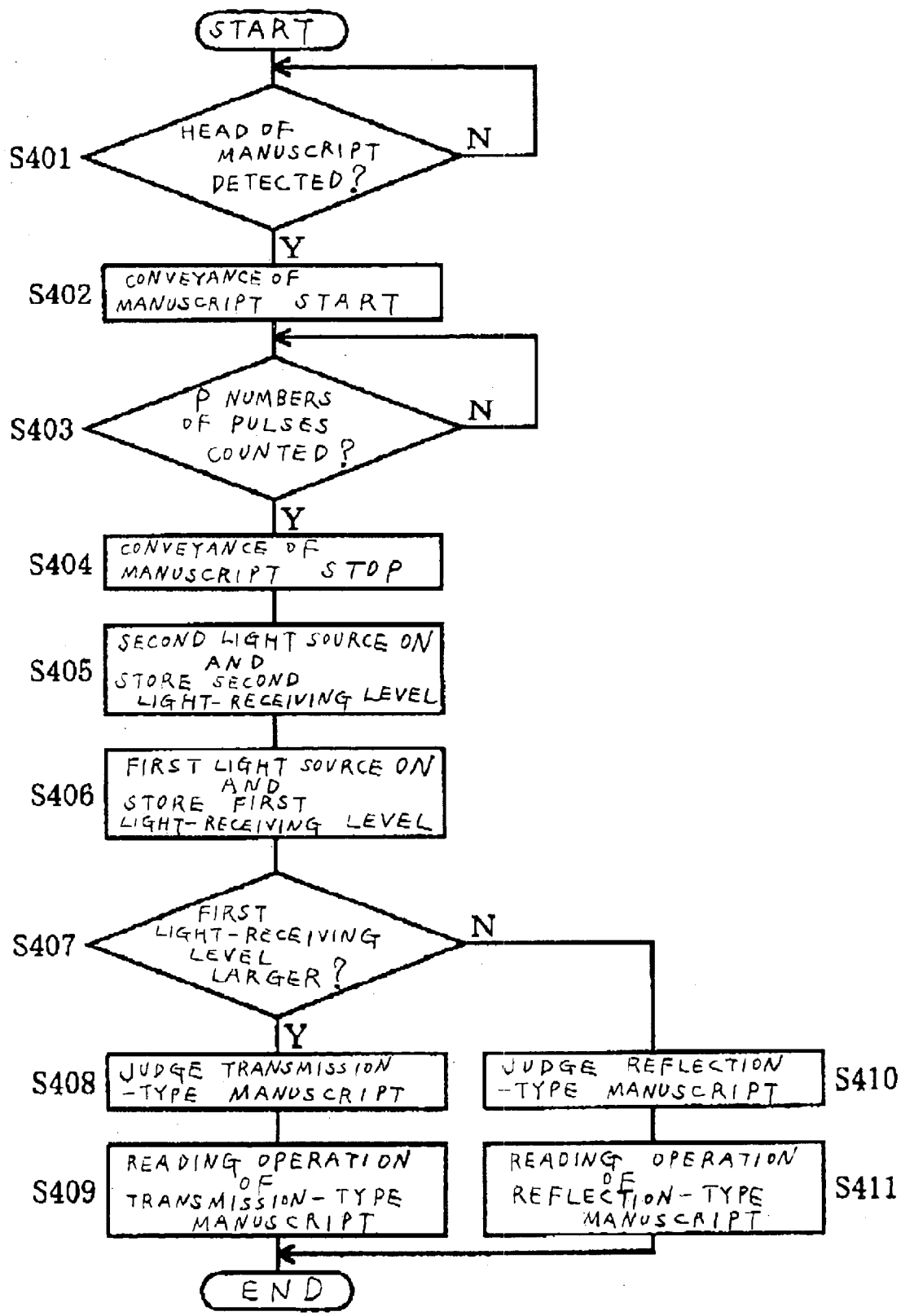
FIG. 9 is a flow chart for showing a judgement whether the manuscript is such a type as read by the use of a reflection light or such an another type as read by the use of a transmission light in an image scanner according to a second embodiment of the present invention.

FIG. 9 is a flow chart for showing a judgement whether the manuscript is such a type as read by the use of a reflection light or such an another type as read by the use of a transmission light in an image scanner according to a second embodiment of the present invention. It is also assumed that the manuscript reading unit 103 is set on the manuscript conveying unit 102 in the image scanner according to the second embodiment similarly to FIGS. 6 and 7 in the first embodiment.

When a head of the manuscript 111 is inserted between the conveying roll 115 and the rotation detecting roll 122 by an operator, the insertion is detected by the manuscript sensor 119 (Yes in S401). The CPU 171 starts conveyance of the manuscript 111 from this time (S402). In addition, counting of pulse signals 155 outputted from the encoder 154 is started. When the pulse signals 155 are counted up to the numbers of pulses P (Yes in S403), the conveyance of the manuscript 111 is stopped temporarily (S404). "this time" is a time when a position progressed several millimeters from a head of the manuscript Ill exists in the reading position of image information. This is for the purpose of enabling a reliable reading of the head of the manuscript 111 by one-dimensional CCD 131 in view of error in conveyance of the manuscript 111.

At this reading position where the conveyance of the manuscript is stopped, in many cases, a white margin of the manuscript 111 is positioned. The CPU 171, at first, switches the second light source 124 ON for a short time. Then, the CPU 171 makes a light-receiving level (digital value) of the one-dimensional CCD 131 on this ON condition of the second light source 124 be stored in RAM 174 (FIG. 5) as a second level (S405). Next, the CPU 171 switches the first light source 114 ON for a short time similarly, at the time when the second light source 124 is switched OFF. Then, the CPU 171 makes a light-receiving level (digital value) of the one-dimensional CCD 131 on this ON condition of the first light source 114 be stored in RAM 174 (FIG. 5) as a first level (S406).

The CPU 171 then compares the stored first and second levels with each other (S407). At this time, since the manuscript 111 is stopping, the first level corresponds to a quantity of transmitting light while the second level corresponds to a quantity of reflected light at the same position. Therefore, for example, like in such a case that the manuscript 111 is a OHP (Over Head Projector) sheet, when the quantity of light in the first level is larger than that in the second level (Yes in S407), the manuscript 111 is judged to be a transmission-type one (S408). Consequently, a reading operation of the manuscript 111 is carried out as depicted in the step S205 and the following steps of FIG. 7 (S409). On the other hand, when the quantity of light in the first level is not larger than that in the second level (No in S407), the manuscript 111 is judged to be a reflection-type one (S410).

Consequently, a reading operation of the manuscript 111 is carried out as depicted in the step 8106 and the following steps of FIG. 6 (S411).

In the interim, the first and the second levels are simply compared with each other in the step S407 of this second embodiment. However, the first and the second levels may be compared with each other, after multiplying either the first or the second level by a predetermined value. Further, the head of the manuscript 111 is read with a portion of the head of several millimeters being failed to be read in the second embodiment. Therefore, when the reading must be done just from the head of the manuscript 111, the reading of the manuscript 111 may be started after making the conveying roll 115 slightly retreat.

Moreover, in the second embodiment, it is assumed that a head of the manuscript 111 includes a margin where image information of black color, or the like does not exist. This is not applied to all of the manuscripts 111. Accordingly, an operator divides all of the manuscripts 111 into two types thereof. In a type of the manuscripts 111 in which a head of the manuscript 111 includes a margin where image information of black color, or the like does not exist, such an automatic judgement and reading of the manuscripts 111 in this embodiment may be applied. On the other hand, in a type of the manuscripts 111 in which a head of the manuscript 111 includes dirt or recorded information, the operator may manually judge the manuscript 111 whether it is a reflection-type one or a transmission-type one.

Of course, it is possible that respective quantity of light of transmission light and reflection light are compared with each other in a plurality of portions of the manuscript 111 so as to judge the type of the manuscript more reliably. When a plurality of portions of the manuscript 111 are checked, there are two methods. One method is to the same manuscript 111 is read twice with the first time being carried out as a pre-scan. Another method is to make the manuscript 111 back up to the reading start position and thereafter the reading of the manuscript 111 is started. In the present invention, both the methods can be effectively carried out.

While this invention has thus far been described in conjunction with two embodiments thereof, it will now be readily possible for one skilled in the art to put this invention into effect in various other manners. For example, CCD is used as one-dimensional image sensor. However, LED (Light Emitting Diode) array may be used in one of or both first and second light sources. In this case, a reading unit can be small in size by using such a device in which LED array, lens array, and light-receiving element are integrated.

What is claimed is:

1. An image scanner for use in reading image information, comprising:

a driving side conveying roll for conveying a manuscript including said image information to be read past a stationary reading position;

a driven side conveying roll which is located above said driving side conveying roll and which rotates by rolling-contact with said driving said conveying roll;

a manuscript sensor for detecting said manuscript when a head of said manuscript arrives at a position near the rolling-contact position between said driving side conveying roll and said driven side conveying roll;

conveying roll driving means for starting a rotation of said driving side conveying roll when said manuscript sensor has detected an arrival of said head of said manuscript;

light-electricity conversion means for carrying out light-electricity conversion of said image information per one line in a main-scanning direction of said manuscript from a side of one surface of said manuscript at said stationary reading position on a conveying route when said driving said conveying roll is started to rotate by said conveying roll driving means and said manuscript is thereby started to move toward the sub-scanning direction between said driving side and said driven side conveying rolls, said stationary reading position existing downstream of said conveying route form the rolling-contact position by a predetermined distance;

a first light source for emitting light onto said stationary reading position from a side of another surface of said manuscript opposite to said one surface thereof;

a second light source for emitting light onto said stationary reading position from a side of the same surface of said manuscript as said one surface thereof; and light source switching control means for selectively rendering either said first light source or said second light source ON to read said image information included in said manuscript, dependent on whether said image information is defined by a reflected light reflected by said manuscript or by a transmitting light transmitting through said manuscript.

2. An image scanner as claimed in claim 1, further comprising an upper housing unit in which said driven side conveying roll, said second light source, and said light-electricity conversion means are contained, and a lower housing unit in which said driving side conveying roll and said first light source are contained, said upper housing unit being separated from said lower housing unit, wherein said upper housing unit is capable of reading image information independently.

3. An image scanner as claimed in claim 2, wherein a lower electric component included in said lower housing unit is controlled by an upper electric component included in said upper housing units are connected by an attachable and removable connector with each other.

4. An image scanner as claimed in claim 1, further comprising an upper housing unit in which said driven side conveying roll, said second light source, and said light-electricity conversion means are contained, and a plurality of mirrors located between said light-electricity conversion means and said reading position, wherein a light path is turned by each of said a plurality of mirrors therebetween.

5. An image scanner as claimed in claim 1, further comprising an encoder which generates a pulse every time said driven said conveying roll makes a predetermined number of rotations.

6. An image scanner for use in reading image information, comprising:

a driving side conveying roll for conveying a manuscript including said image information to be read past a stationary reading position;

a driven side conveying roll which is located above said driving side conveying roll and which rotates by rolling-contact with said driving side conveying roll;

a manuscript sensor for detecting said manuscript when a head of said manuscript arrives at a position near the rolling-contact position between said driving said conveying roll and said driven side conveying roll;

conveying roll driving means for starting a rotation of said driving side conveying roll when said manuscript sensor has detected an arrival of said head of said manuscript;

light-electricity conversion means for carrying out light-electricity conversion of said image information per one line in a main-scanning direction of said manuscript from a side of one surface of said manuscript at said stationary reading position on a conveying route when said driving side conveying roll is started to rotate by said conveying roll driving means and said manuscript is thereby started to move toward the sub-scanning direction between said driving side and said driven side conveying rolls, said stationary reading position existing downstream of said conveying route from the rolling-contact position by a predetermined distance;

a first light source for emitting light onto said stationary reading position from a side of another surface of said manuscript opposite to said one surface thereof;

a second light source for emitting light onto said stationary reading position from a side of the same surface of said manuscript as said one surface thereof;

light source selection input means for inputting whether either said first light source or said second light source should be selected, dependent on whether said image information is defined by a reflected light reflected by said manuscript or by a transmitting light transmitting through said manuscript, and light source switching control means for selectively rendering either said first light source or said second light source ON to read said image information included in said manuscript, responsive to a result of selection by said light source selection input means.

7. An image scanner as claimed in claim 6, further comprising an upper housing unit in which said driven side conveying roll, said second light source, and said light-electricity conversion means are contained, and a lower housing unit in which said driving side conveying roll and said first light source are contained, said upper housing unit being separated from said lower housing unit, wherein said upper housing unit is capable of reading image information independently.

8. An image scanner as claimed in claim 7, wherein a lower electric component included in said lower housing unit is controlled by an upper electric component include in said upper housing unit, and wherein said upper sand said lower housing units are connected by an attachable and removable connector with each other.

9. An image scanner as claimed in claim 6, further comprising an upper housing unit in which said driven side conveying roll, said second light source, and said light-electricity conversion means are contained, and a plurality of mirrors located between said light-electricity conversion means and said reading position, wherein a light path is turned by each of said a plurality of mirrors therebetween.

10. An image scanner as claimed in claim 6, further comprising an encoder which generates a pulse every time said driven side conveying roll makes a predetermined number of rotations.

11. An image scanner for use in reading image information, comprising:

a driving side conveying roll for conveying a manuscript including said image information to be read;

a driven side conveying roll which is located above said driving side conveying roll and which rotates by rolling-contact with said driving side conveying roll;

a manuscript sensor for detecting said manuscript when a head of said manuscript arrives at a position near the rolling-contact position between said driving side conveying roll and said driven side conveying roll;

conveying roll driving means for starting a rotation of said driving side conveying roll when said manuscript sensor has detected an arrival of said head of said manuscript;

light-electricity conversion means for carrying out light-electricity conversion means for carrying out light-electricity conversion of said image information per one line in a main-scanning direction of said manuscript from a side of one surface of said manuscript at a reading position on a conveying route when said driving side conveying roll is started to rotate by said conveying roll driving means and said manuscript is thereby started to move toward the sub-scanning direction between said driving side and said driven side conveying rolls, said reading position existing downstream of said conveying route form the rolling-contact position by a predetermined distance;

a first light source for emitting light onto said reading position form a side of another surface of said manuscript opposite to said one surface thereof;

a second light source for emitting light onto said reading position from a side of the same surface of said manuscript as said one surface thereof; and manuscript type judging means which respectively renders said first and said second light sources exclusively ON on a condition that said manuscript is existing at said reading position to compare respective signal levels after conversion by light-electricity conversion means, and which thereby judge whether said manuscript is such a type of manuscript as read by a transmitting light transmitting through said manuscript or such an another type of manuscript as read by a reflected light reflected by said manuscript; and light source switching control means for selectively rendering either said first light source or said second light source ON to read said image information included in said manuscript, responsive to a result of judgement by said manuscript type judging means.

12. An image scanner as claimed in claim 11, further comprising an upper housing unit in which said driven said conveying roll, said second light source, and said light-electricity conversion means are contained, and a lower housing unit in which said driving side conveying roll and said first light source are contained, said upper housing unit being separated from said lower housing unit, wherein said upper housing unit is capable of reading image information independently.

13. An image scanner as claimed in claim 12, wherein a lower electric component included in said lower housing unit is controlled by an upper electric component included in said upper housing unit, and wherein said upper and said lower housing units are connected by an attachable and removable connector with each other.

14. An image scanner as claimed in claim 11, further comprising an upper housing unit in which said driven side conveying roll, said second light source, and said light-electricity conversion means are contained, and a plurality of mirrors located between said light-electricity conversion means and said reading position, wherein a light path is turned by each of said a plurality of mirrors therebetween.

15. An image scanner as claimed in claim 11, further comprising an encoder which generates a pulse every time said driven side conveying roll makes a predetermined number of rotations.

16. An image scanner as claimed in claim 11, wherein said image scanner, after said manuscript type judging means have judged whether said manuscript is such a type of manuscript as read by a transmitting light transmitting through said manuscript or such an another type of manuscript as read by a reflected light reflected by said manuscript, reversibly moves the manuscript until a head of the manuscript reaches said reading position and then starts conveying the manuscript in said sub-scanning direction to read the manuscript.

17. An image scanner, comprising:

a driving side conveying roll that conveys a manuscript;

a driven side conveying roll located above said driving side conveying roll;

a manuscript sensor that detects when said manuscript arrives at a position near the rolling-contact position between said driving side conveying roll and said driven side conveying roll;

a conveying roll driver that rotates said driving side conveying roll when said manuscript sensor detects an arrival of said head of said manuscript;

a light-electricity converter that converts light including image information to electricity in a main-scanning direction of said manuscript from a surface of said manuscript when said driving conveying roll rotates to move said manuscript toward a sub-scanning direction between said driving side and said driven side conveying rolls, a reading position being downstream in a conveying route from the rolling-contact position by a predetermined distance;

a first light source that emits light onto another surface of said manuscript;

a second light source that emits light onto said surface of said manuscript;

a light source switching controller that selectively renders either said first light source or said second light source ON to read said image information based on whether said image information is defined by light reflected by said manuscript or by light transmitting through said manuscript; and an encoder which generates a pulse every time said driven side conveying roll makes a predetermined number of rotations, and wherein said image scanner reads one line of said image information in synchronization with said pulse, said reading of said image information starting when said pulse is generated, said reading of said image information terminating when a predetermined time has passed after said pulse.

18. An image scanner, comprising:

a driving side conveying roll that conveys a manuscript including an image;

a driven side conveying roll which is located above said driving side conveying roll and which rotates with said driving side conveying roll;

a manuscript sensor that detects said manuscript when a head of said manuscript arrives at a position near a rolling-contact position between said driving side conveying roll and said driven side conveying roll;

a conveying roll driver that rotates said driving side conveying roll when said manuscript sensor detects said manuscript;

a light-electricity converter that converts light including image information to electricity in a main-scanning direction of said manuscript from a side of said manuscript when said driving side conveying roll rotates to move said manuscript in the sub-scanning direction between said driving side and said driven side conveying rolls, a reading position being downstream in a conveying route from the rolling-contact position by a predetermined distance;

a first light source that emits light onto another surface of said manuscript;

a second light source that emits light onto said surface of said manuscript;

a light source selection inputter that inputs whether said first light source or said second light source is selected based upon whether said image information is defined by light reflected by said manuscript or by light transmitting through said manuscript;

a light source switching controller that selectively renders either said first light source or said second light source ON to read said image information in response to a result of said input from said light source selection inputter; and an encoder which generates a pulse every time said driven side conveying roll makes a predetermined number of rotations, and wherein said image scanner reads one line of said image information in synchronization with said pulse, said reading of said image information starting when said pulse is generated, said reading of said image information terminating when a predetermined time has passed after said pulse.

19. An image scanner, comprising:

a driving side conveying roll that conveys a manuscript including an image;

a driven side conveying roll which is located above said driving side conveying roll and which rotates with said driving side conveying roll;

a manuscript sensor that detects said manuscript when a head of said manuscript arrives at a position near a rolling-contact position between said driving side conveying roll and said driven side conveying roll;

a conveying roll driver that rotates said driving side conveying roll when said manuscript sensor detects said manuscript;

a light-electricity converter that converts light including image information to electricity in a main-scanning direction of said manuscript from a side of said manuscript when said driving side conveying roll rotates to move said manuscript in the sub-scanning direction between said driving side and said driven side conveying rolls, a reading position being downstream in a conveying route from the rolling-contact position by a predetermined distance;

a first light source that emits light onto another surface of said manuscript;

a second light source that emits light onto said surface of said manuscript;

a manuscript type judger which respectively renders said first and said second light sources exclusively ON based on whether said manuscript is read by light transmitting through said manuscript or read by light reflected by said manuscript based upon a comparison of respective signal levels from said light-electricity converter;

a light source switching controller that selectively renders either said first light source or said second light source ON in response to said judgement by said manuscript type judger; and an encoder which generates a pulse every time said driven side conveying roll makes a predetermined number of rotations, and wherein said image scanner reads one line of said image information in synchronization with said pulse, said reading of said image information starting when said pulse is generated, said reading of said image information terminating when a predetermined time has passed after said pulse.

* * * * *